United States Patent [19]

Lucas et al.

[11] Patent Number: 5,794,282
[45] Date of Patent: Aug. 18, 1998

[54] TEMPERATURE-INDICATING WATER DIVERTER FOR WATER SPOUT

[76] Inventors: Carol A. Lucas; John T. Lucas, both of 25225 Perch Dr., Dana Point, Calif. 92629

[21] Appl. No.: 807,698

[22] Filed: Feb. 28, 1997

[51] Int. Cl.[6] ............................................. E03C 1/04
[52] U.S. Cl. ................................... 4/678; 4/675; 4/605
[58] Field of Search ............................. 4/675, 676, 677, 4/678, 597, 605, 567, 568

[56] References Cited

U.S. PATENT DOCUMENTS

| | | | |
|---|---|---|---|
| 4,862,524 | 9/1989 | Kimak | 4/675 |
| 4,965,894 | 10/1990 | Baus | 4/605 |
| 5,076,709 | 12/1991 | Tognotti | 4/605 |
| 5,160,197 | 11/1992 | Klose | 4/605 |

*Primary Examiner*—David J. Walczak
*Attorney, Agent, or Firm*—Stetina Brunda Garred Brucker

[57] ABSTRACT

A water diverter for placement in a water delivery spout, and a water delivery spout in association with the water diverter. The diverter has a water diverting member for directing water flowing through the spout to a selectable delivery destination, a temperature sensor to be disposed in the flowing water, and a temperature display for reporting the temperature of the water as measured by the temperature sensor. Preferably, the water diverter member, temperature sensor and temperature display are connected to each other, with a hand-operable knob disposed exteriorly of the spout to effectuate movement of the water diverting member while being in communication with the temperature sensor to thereby function as the temperature display.

6 Claims, 1 Drawing Sheet

U.S. Patent  Aug. 18, 1998  5,794,282
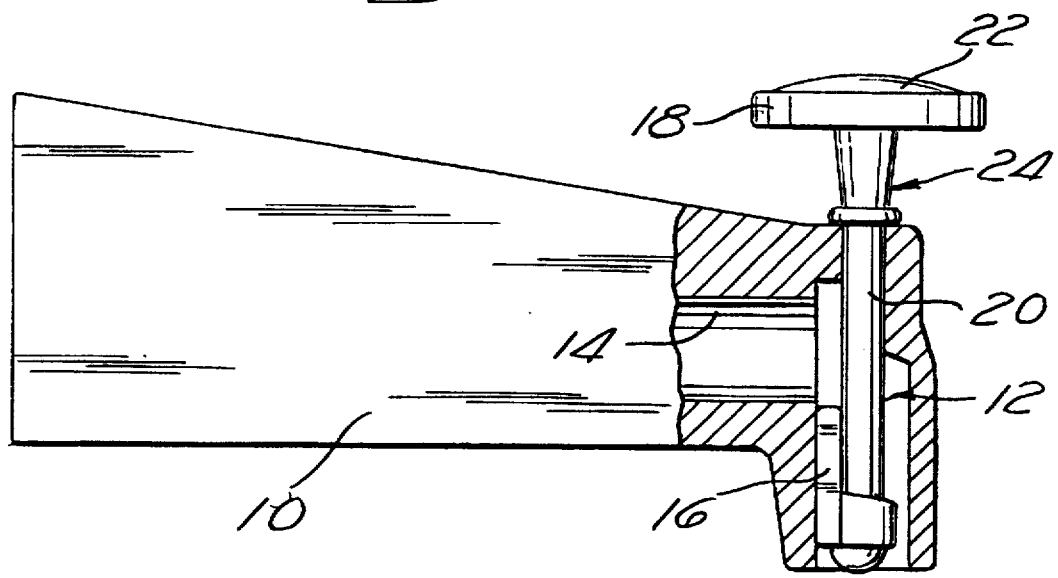
Fig.1
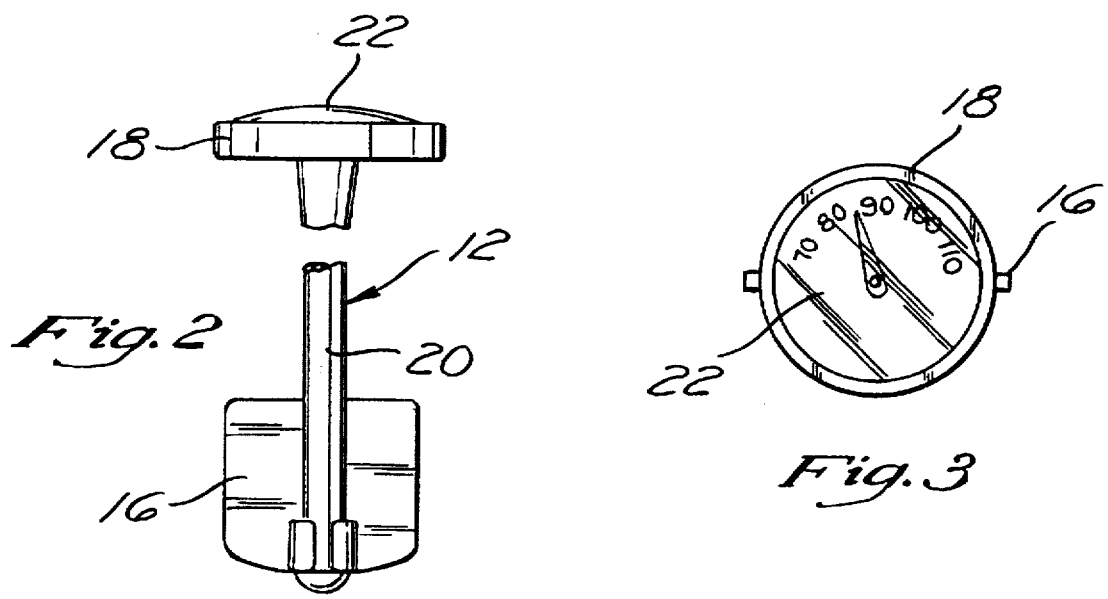
Fig.2
Fig.3 ic # TEMPERATURE-INDICATING WATER DIVERTER FOR WATER SPOUT

FIELD OF THE INVENTION

This invention relates in general to plumbing fixtures, and in particular to a temperature-indicating water diverter for placement in a water delivery spout such that a water diverting member thereof directs flowing water to a selectable destination while a temperature sensor is disposed in the flowing water and a temperature display reports water temperature as detected by the sensor.

BACKGROUND OF THE INVENTION

A usual bathtub-and-shower installation in most home bathrooms is accomplished by providing a single water source to a water delivery spout that has a hand-operable water diverter therein to direct water to the bathtub or to the shower head as desired by the user. Typically, the diverter has an exteriorly accessible knob projecting from the spout and in communication with a water diverting member. Pulling the knob upwardly moves the water diverting member so that it blocks water flow through the spout to the bathtub, but, instead, directs the water through piping leading from the spout to the shower head.

Since the default position for the water diverter directs water through the spout to the bathtub, the usual procedure for a person planning to take either a bath or a shower is to turn the water on and allow it to flow into the bathtub. For those planning to take a shower, it is common to allow the water to run for a while before placing a hand in the flowing water to check by feel on its relative heat for shower comfort. For those planning to take a bath, it is common to close the bathtub drain and allow the water to run for a period of time. Either process can easily result in a waste of water. In particular, with respect to the shower taker, the water probably will run too long before its heat comfort is checked and the shower head is engaged. With respect to the bath taker, it is common to permit tub water to flow without checking heat comfort. When this occurs and is discovered, extra water must be used to either cool or heat the water already in the bathtub before a person can bathe. In either event water is wasted because water temperature is not readily apparent to a person when preparing to take a bath or shower.

In view of the cumulative amount of excess water that can be wasted, it is evident that a need is present to provide accurate water temperature information to a user so that water comfort can be achieved without waste. Accordingly, it is a primary object of the present invention to provide a water delivery spout fixture with a water diverter that can provide water temperature information during water flow within the fixture.

Another object of the present invention is to provide a water diverter whose construction includes a water diverting member, a temperature sensor to be disposed in the flowing water, and a temperature display for reporting the temperature of the temperature sensor.

These and other objects of the present invention will become apparent throughout the description thereof which now follows.

SUMMARY OF THE INVENTION

The present invention is a water diverter for placement in a water delivery spout, and a water delivery spout in association with the water diverter. The diverter comprises a water diverting member for directing water flowing through the spout to a selectable delivery destination, a temperature sensor to be disposed in the flowing water, and a temperature display for reporting the temperature of the water as measured by the temperature sensor. Preferably, the water diverter member, temperature sensor and temperature display are connected to each other, with a hand-operable knob disposed exteriorly of the spout to effectuate movement of the water diverting member while being in communication with the temperature sensor to thereby function as the temperature display. As is evident, the water diverter of the present invention serves as both a water flow director and water temperature indicator. In use, the diverter reports water temperature to a user to thereby permit immediate use of water once the water reaches a desired temperature. This immediate information can result in minimal water waste since direct temperature reporting can replace time-consuming water testing by hand or replacement of water already collected in a bathtub because of improper temperature.

BRIEF DESCRIPTION OF THE DRAWINGS

FIG. 1 is a side elevation view partially in section of a water delivery spout with accompanying water diverter;

FIG. 2 is a front elevation view of the water diverter of FIG. 1; and

FIG. 3 is a top plan view of the water diverter of FIG. 2.

DETAILED DESCRIPTION OF THE PREFERRED EMBODIMENT

Referring to FIG. 1, a water delivery spout 10 having a water diverter 12 is shown. The water diverter 12 functions to direct water in a standard manner as known in the art either through the end 14 of the spout 10 for delivery to a bathtub (not shown), for example, or to a shower head (not shown) disposed well above the spout 10. As illustrated in FIGS. 1–3, the water diverter 12 comprises a water diverting member 16 having a knob 18 disposed exteriorly of the spout 10. Lifting the knob 18 by hand effectuates movement of the water diverter 12 and consequent movement of the water diverting member 16 such that the member 16 blocks water flow from the end 14 of the spout 10 and directs the water flow to the shower head. The water diverter 12 additionally comprises both a temperature sensor 20, to be situated within the flow of water flowing through the end 14 of the spout 10, and a temperature display 22 for reporting the temperature of the flowing water. In the preferred embodiment, the temperature sensor 20 and temperature display 22 are a single thermometer unit 24 wherein a cylindrical temperature sensor 20 is connected to the water diverting member 16 such that movement of the thermometer unit 24 moves the water diverter 12 and consequently moves the water diverting member 16 as described above. As shown in FIG. 3, the knob 18 contains the temperature display 22, and provides an analog temperature reading. Since the range of temperature for bath or shower water is relatively narrow, the range of temperature reporting via the analog dial can be from about 70° to about 110° F. Additionally, color coding, such as blue for the lower end of the temperature span and red for the upper end thereof can be included on the analog dial. Construction of the thermometer unit 24 of the preferred embodiment is that of a standard thermometer as known in the art such as a typical meat thermometer except with a cylindrical sensor 20 sized to fit within the spout 10. It is to be understood, however, that such construction as here shown for the preferred embodiment is not limiting, and that temperature sensing and reporting can be constructed for electronic operation and readout so long as electrical components are properly isolated from untoward moisture.

Operation of the water diverter 12 is accomplished by a user turning on water at a spout 10 such as in a bathtub and allowing the water to flow while observing the temperature display 22. When the water temperature reaches a comfortable value, as earlier determined in sample measurements, the bathtub drain can be closed if a bath is to be taken, or the knob 18 can be moved upwardly to cause water passage to the shower head. Thereafter, the user can commence bathing.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A one-piece water diverter for placement in a water delivery spout, the diverter comprising:
   a) a temperature sensing water flow direction control member for directing water flowing through the spout to a selectable delivery destination as selectable by movement of the flow direction control member in the water delivery spout such that water flows about the water flow direction control member and the temperature of said water is sensed by said flow direction control member; and
   b) an externally viewable temperature display member in communication with the flow direction control member for reporting the temperature of the water as sensed by the flow direction control member.

2. A one-piece water diverter as claimed in claim 1 wherein the temperature display member is disposed within a knob attached to the flow direction control member.

3. A one-piece water diverter as claimed in claim 2 wherein the temperature sensing water flow direction control member is generally cylindrical and the knob is attached to the top of said member.

4. A water delivery apparatus in communication with a water source, the apparatus comprising:
   a) a water delivery spout; and
   b) a one-piece water diverter disposed in the spout, said diverter comprising:
      1) a temperature sensing water flow direction control member for directing water flowing through the spout to a selectable delivery destination as selectable by movement of the flow direction control member in the water delivery spout such that water flows about the water flow direction control member and the temperature of said water is sensed by the flow direction control member; and
      2) an externally viewable temperature display member in communication with the flow direction control member for reporting the temperature of the water as sensed by the flow direction control member.

5. A water delivery apparatus as claimed in claim 4 wherein the temperature display member of the water diverter is disposed within a knob attached to the flow direction control member.

6. A water delivery apparatus as claimed in claim 5 wherein the temperature sensing water flow direction control member of the water diverter is generally cylindrical and the knob is attached to the top of said flow direction control member.

* * * * *